United States Patent
Frovik

(10) Patent No.: US 9,612,147 B2
(45) Date of Patent: Apr. 4, 2017

(54) RADAR LEVEL GAUGE SYSTEM WITH MULTIPLE RECEIVER BRANCHES

(71) Applicant: Rosemount Tank Radar AB, Gothenburg (SE)

(72) Inventor: Christer Frovik, Linkoping (SE)

(73) Assignee: Rosemount Tank Radar AB, Gothenburg (SE)

(*) Notice: Subject to any disclaimer, the term of this patent is extended or adjusted under 35 U.S.C. 154(b) by 383 days.

(21) Appl. No.: 14/176,450

(22) Filed: Feb. 10, 2014

(65) Prior Publication Data

US 2015/0226594 A1 Aug. 13, 2015

(51) Int. Cl.

| | | |
|---|---|---|
| *G01S 13/08* | (2006.01) | |
| *G01F 23/284* | (2006.01) | |
| *G01S 13/88* | (2006.01) | |
| *G01S 7/02* | (2006.01) | |
| *G01S 7/40* | (2006.01) | |
| *G01S 13/02* | (2006.01) | |
| *G01S 7/285* | (2006.01) | |
| *G01S 7/35* | (2006.01) | |

(52) U.S. Cl.
CPC ............ *G01F 23/284* (2013.01); *G01S 7/02* (2013.01); *G01S 7/40* (2013.01); *G01S 13/02* (2013.01); *G01S 13/88* (2013.01); *G01S 7/285* (2013.01); *G01S 7/352* (2013.01)

(58) Field of Classification Search
CPC .... G01F 23/284; G01F 25/0061; G01S 13/88; G01S 7/02
USPC ........................................................ 342/124
See application file for complete search history.

(56) References Cited

U.S. PATENT DOCUMENTS

| | | | |
|---|---|---|---|
| 6,690,320 B2 | 2/2004 | Benway et al. | |
| 6,922,150 B2* | 7/2005 | Håll | F17C 13/021 |
| | | | 340/612 |
| 7,304,601 B1 | 12/2007 | Edvardsson | |
| 7,355,548 B2 | 4/2008 | Larsson et al. | |
| 2007/0046528 A1* | 3/2007 | Larsson | G01F 23/284 |
| | | | 342/124 |

(Continued)

FOREIGN PATENT DOCUMENTS

EP 2 660 568 6/2013

OTHER PUBLICATIONS

Notification of Transmittal of the International Search Report and the Written Opinion of the International Searching Authority for Application PCT/EP2015/052327, dated Apr. 22, 2015.

*Primary Examiner* — Marcus Windrich
(74) *Attorney, Agent, or Firm* — Westman, Champlin & Koehler, P.A.

(57) ABSTRACT

The present invention relates to a radar level gauge system comprising a first receiver branch for converting a reflection signal to a first digital measurement signal, and a second receiver branch configured to convert the reflection signal to a second digital measurement signal. The first receiver branch modulates an amplitude of the first measurement signal according to a first gain function, and the second receiver branch modulates an amplitude of the second measurement signal according to a second gain function different from the first gain function. The radar level gauge system further comprises processing circuitry configured to determine the filling level based on the first measurement signal and the second measurement signal.

14 Claims, 6 Drawing Sheets

(56) References Cited

U.S. PATENT DOCUMENTS

| | | | |
|---|---|---|---|
| 2007/0182621 A1* | 8/2007 | Fehrenbach | G01F 23/284 342/124 |
| 2007/0186678 A1* | 8/2007 | Griessbaum | G01F 23/284 73/861 |
| 2008/0302439 A1 | 12/2008 | Spanke et al. | |
| 2009/0303106 A1* | 12/2009 | Edvardsson | G01F 23/284 342/124 |
| 2010/0156702 A1* | 6/2010 | Edvardsson | G01F 23/284 342/124 |
| 2011/0163910 A1* | 7/2011 | Sai | G01F 23/284 342/124 |
| 2012/0056774 A1* | 3/2012 | Wennerberg | G01F 23/284 342/124 |
| 2012/0169528 A1* | 7/2012 | Edvardsson | G01F 23/284 342/124 |

\* cited by examiner

RADAR LEVEL GAUGE SYSTEM WITH MULTIPLE RECEIVER BRANCHES

TECHNICAL FIELD OF THE INVENTION

The present invention relates to a radar level gauge system and to a method of determining a filling level in a tank.

TECHNICAL BACKGROUND

Radar level gauge systems are in wide use for measuring the filling level in tanks. Radar level gauging is generally performed by propagating an electromagnetic transmit signal towards a product in the tank, and receiving an electromagnetic reflection signal resulting from reflection of the transmit signal at impedance transitions encountered by the transmit signal, including the surface of the product.

The transmitted electromagnetic signal may be radiated towards the product contained in the tank, or may be guided towards and into the product by a transmission line probe. The latter is often referred to as Guided Wave Radar (GWR).

Radar level gauges are often generally classified as either pulsed systems or FMCW-type systems.

Pulsed radar level gauge systems may have a first oscillator for generating a transmit signal formed by pulses for transmission towards the surface of the product contained in the tank with a transmitted pulse repetition frequency $f_t$, and a second oscillator for generating a reference signal formed by reference pulses with a reference pulse repetition frequency $f_r$ that differs from the transmitted pulse repetition frequency by a given frequency difference $\Delta f$. This frequency difference $\Delta f$ is typically in the range of Hz or tens of Hz.

At the beginning of a measurement sweep, the transmit signal and the reference signal are synchronized to have the same phase. Due to the frequency difference $\Delta f$, the phase difference between the transmission signal and the reference signal will gradually increase during the measurement sweep.

During the measurement sweep, the reflection signal formed by the reflection of the transmit signal at impedance transitions encountered by the transmit signal is being correlated with the reference signal, to form a measurement signal based on a time correlation (equivalent to a phase relation) between the reflection signal and the reference signal. Based on the measurement signal, the filling level can be determined.

In FMCW-type radar level gauge systems, a transmit signal with a time-varying frequency is transmitted towards the surface and the distance to the surface is determined based on the frequency (and/or phase) difference between the transmit signal and the reflection signal. The transmit signal and the reflection signal may be combined in a mixer, which results in a so-called intermediate frequency signal indicative of a phase relation (specifically a phase/frequency difference) between the transmit signal and the reflection signal. The distance to the surface can be determined based on the measured phase/frequency difference and the known variation over time of the phase/frequency of the transmit signal.

In order to determine the filling level of the product in the tank, the distance to a reference impedance transition at a known vertical position is often determined in addition to the distance to the surface of the product. The filling level can be deduced from the distance between the reference impedance transition and the surface of the product, and the known vertical position of the reference impedance transition.

The reference impedance transition may, for example, conveniently be provided through an impedance discontinuity at the connection between the signal propagation device (such as antenna or transmission line probe) and the transceiver of the radar level gauge system.

In this case, for example, the reference echo signal reflected by the reference impedance transition may have considerably larger amplitude than the surface echo signal reflected by the surface of the product.

This may make it difficult to determine a suitable gain function for the received reflection signal and/or determine a suitable gain function for a measurement signal formed based on the reflection signal and the transmit signal. Either the gain may be too high, which may result in the reference echo signal being saturated, or the gain may be too low, which may result in difficulties in distinguishing the surface echo signal.

U.S. Pat. No. 6,690,320 addresses this problem by using a relatively low amplification factor in the beginning of each measurement cycle, and once timing information has been extracted from the fiducial pulse, the software increases the amplification factor to a higher value which is optimal for extracting the timing information from the much smaller level echo pulse.

However, there appears to be room for improvement in relation to the method according to U.S. Pat. No. 6,690,320, in particular for cases where the distance between the reference impedance transition and the surface of the product is relatively small.

SUMMARY

In view of the above-mentioned and other drawbacks of the prior art, a general object of the present invention is to provide for an improved filling level determination.

According to a first aspect of the present invention, it is therefore provided a radar level gauge system for determining a filling level of a product in a tank, comprising: a signal propagation device arranged to propagate an electromagnetic transmit signal towards a surface of the product and to return an electromagnetic reflection signal resulting from reflection of the electromagnetic transmit signal at impedance discontinuities encountered by the transmit signal; transmitter circuitry coupled to the signal propagation device and configured to generate and transmit the transmit signal during a measurement cycle; receiver circuitry coupled to the signal propagation device and configured to receive the reflection signal during the measurement cycle, the receiver circuitry comprising: a first receiver branch configured to transform the reflection signal to a digital first measurement signal being indicative of a phase relation between the transmit signal and the reflection signal received during the measurement cycle, the first measurement signal being amplitude-modulated according to a first gain function in relation to the reflection signal; and a second receiver branch configured to transform the reflection signal to a digital second measurement signal being indicative of a phase relation between the transmit signal and the reflection signal received during the measurement cycle, the second measurement signal being amplitude-modulated according to a second gain function, different from the first gain function, in relation to the reflection signal; and processing circuitry coupled to the first receiver branch and the second receiver branch, and configured to determine the filling level based on the first measurement signal and the second measurement signal.

By the term "gain function" should be understood an amplitude relation between the first/second measurement signal and the received signal. Since the first/second measurement signal is a digital signal (sequence of signal values), the amplitude relation is between the signal values and the received signal amplitude.

Depending on the particular embodiment of the radar level gauge system (for example if the radar level gauge system is a so-called pulsed radar level gauge system or is a radar level gauge system of the FMCW-type), and/or depending on the application or measurement case, the first and second gain functions may represent different relations between the amplitude of the digital first/second measurement signal and the analog reflection signal.

For instance, the gain functions may be frequency independent or frequency dependent.

In the case of a frequency independent gain function, the above-mentioned amplitude modulation may involve multiplication across the frequency spectrum of the measurement signal by a gain factor that may be smaller or larger than unity (or equal to unity). Alternatively, a frequency independent gain function may involve multiplication with a first gain factor for amplitude values above a reference voltage level and multiplication with a second gain factor, different from the first gain factor, for amplitude values below the reference level. The reference voltage level may, for example, conveniently be 0 V, and then positive amplitude values may be multiplied with the first gain factor and negative amplitude values may be multiplied with the second gain factor.

In the case of a frequency dependent gain function, certain frequency ranges may be strongly attenuated, effectively blocked, while other frequency ranges may be amplified or only weakly attenuated. Moreover, the gain may be controlled to vary substantially continuously with frequency. For instance, in an FMCW-type radar level gauge system, a longer distance to the surface (or another impedance transition) corresponds to a higher frequency of the measurement signal (often referred to as intermediate frequency signal or IF-signal). To compensate for the increased attenuation resulting from a longer propagated path, higher frequencies may be amplified more than lower frequencies.

A frequency dependent gain function may advantageously be implemented using one or several analog filters.

Accordingly, the first receiver branch may comprise a first gain function block, which may comprise a first amplifier and/or a first frequency filter. Analogously, the second receiver branch may comprise second gain function block, which may comprise a second amplifier and/or a second frequency filter. The first/second gain function block applies a first/second gain function to the input signal to the first/second gain function block an outputs an amplitude-modulated output signal, that has been amplitude-modulated according to the first/second gain function. Although it has already been mentioned, it should be emphasized that either of the first and second gain function blocks may apply the simplest possible gain functions, which is unity gain.

The radar level gauge system may advantageously comprise additional receiver branches providing other gain functions.

The present invention is based on the realization that a reliable and accurate determination of the distance to the surface of the product in the tank can be achieved by splitting the signal path from propagation device to processing circuitry into at least a first and a second receiver branch providing different gain functions. A given reflection signal will then result in two digital measurement signals that carry information about the same phase (timing) relation between the transmit signal and the reflection signal, but have been subjected to different gain functions. This may, for example, be used for, simultaneously and within the same measurement cycle, conditioning the different measurement signals so that they are optimized for measurement in different zones in the tank and/or for impedance transitions with distinctly different properties.

Since the first and second measurement signals originate from the same reflection signal, embodiments of the present invention allow accurate determination of the vertical positions of the reference impedance transition (where applicable) and the surface of the product also when the surface is close to the reference impedance transition and even if the surface would be at a higher vertical position than the reference impedance transition.

Furthermore, regardless of whether or not the radar level gauge system comprises a reference impedance transition, the provision of two copies of the same measurement signal being amplitude-modulated according to different gain functions allows for more advanced signal processing, whereby, for example, the sensitivity of the filling level measurement may be improved.

Moreover, comparison of the two (or more) measurement signals allows for calibration of various components along the first and/or second receiver branches. For instance, filters and/or amplifiers may be calibrated against each other.

Additionally, comparison of the measurement signals may be used to detect errors in one of the receiver branches, such as component malfunction. This further improves the reliability of the radar level gauge system. Embodiments of the present invention further provide redundant filling level determination, which in itself improves the reliability of the filling level determination.

The second receiver branch may advantageously be at least partly parallel to the first receiver branch, providing different signal paths between the signal propagation device and the processing circuitry. The reflection signal is simultaneously transformed in the at least partly parallel receiver branches.

Moreover, at least one of the receiver branches may comprise amplifier circuitry and/or at least one frequency filter, for achieving the above-discussed gain functions providing frequency independent or frequency independent amplitude modulation.

According to various embodiments, the first receiver branch may comprise first analog-to-digital converter circuitry; and the second receiver branch may comprise second analog-to-digital converter circuitry, different from the first analog-to-digital converter circuitry.

The radar level gauge system may comprise two identical ADC (Analog-to-Digital Converter) components, or the first analog-to-digital converter circuitry and the second analog-to-digital converter circuitry may be combined in a single component, a so-called stereo ADC.

Alternatively, the radar level gauge system may comprise a first ADC with first conversion parameters (for example a first dynamic range) and a second ADC with second conversion parameters (for example a second dynamic range), wherein the first and second gain functions may be at least partly provided by the first and second (different) conversion parameters.

According to various embodiments of the present invention, the radar level gauge system may further comprise a reference impedance transition; and the processing circuitry may be configured to: determine a first distance to the reference impedance transition based on the first measurement signal; determine a second distance to the surface of the product based on the second measurement signal; and determine the filling level based on the first distance and the second distance.

As was mentioned above in the Background section, the reference impedance transition may, for example, conveniently be provided through an impedance discontinuity at the connection between the signal propagation device (such as antenna or transmission line probe) and the transceiver of the radar level gauge system.

Since the reflection signal from the reference impedance transition may often be considerably stronger than the reflection signal from the surface of the product in the tank, the first and second gain functions may advantageously be first and second constant gain factors, where the second gain factor is greater than the first gain factor.

A reference impedance transition may, furthermore, be configured to result in a reflection with opposite polarity (such as negative) in relation to the reflection resulting from the surface of the product. In that case, the first gain function may exhibit a polarity dependent gain with a smaller gain factor for negative amplitudes (if reflection from the reference impedance transition is negative) than for positive amplitudes.

According to various embodiments of the radar level gauge system of the present invention, the processing circuitry may comprise hybrid signal forming circuitry configured to form a hybrid measurement signal comprising at least one segment of the first measurement signal and at least one segment of the second measurement signal. The processing circuitry may further be configured to determine the filling level based on the hybrid measurement signal.

According to various embodiments of the radar level gauge system of the present invention, the processing circuitry may comprise selection circuitry configured to select one of said first measurement signal and said second measurement signal based on a signal criterion; and said processing circuitry is configured to determine said filling level based on the selected one of said first measurement signal and said second measurement signal.

Which measurement signal is considered to be the 'best' may vary with varying conditions in the tank etc.

For instance, a plurality of measurement signals coming from different parallel receiver branches may be evaluated in respect of how well they utilize the available dynamic range of the particular receiver branch. Contamination of the propagation device and/or changing properties of the tank atmosphere may result in a different measurement signal being selected for filling level determination. It should be noted that the filling level should still be considered to have been determined based on the different first and second measurement signals, as both (all) have been evaluated and a selection has been made.

In various embodiments, the radar level gauge system may further comprise reference signal providing circuitry coupled to receiver circuitry and to the second measurement circuitry, the reference signal providing circuitry being configured to provide an electromagnetic reference signal indicative of a phase (or equivalently—timing) of the transmit signal.

According to various embodiments, the first receiver branch and the second receiver branch may share the same combining circuitry configured to combine the reflection signal and the reference signal. In these embodiments, the different gain functions may be achieved downstream from the combining circuitry, for example through amplifying circuitry and/or frequency filter(s).

The combining circuitry may for example correlate the reflection signal and the reference signal so that the timing (phase) relation between the reflection signal and the reference signal (and thus the transmit signal) can be determined from the resulting measurement signal. For instance, the sampling of the reflection signal may be controlled by the reference signal.

According to a first set of embodiments of a so-called pulsed radar level gauge system, the transmit signal generating circuitry may comprise a transmit pulse generator configured to generate the transmit signal in the form of a transmit pulse train having a transmit pulse repetition frequency; and the reference signal providing circuitry may comprise controllable delay circuitry coupled to the transmit signal generating circuitry, to provide the reference signal in the form of the transmit signal being subjected to a time-varying delay.

According to a second set of embodiments of a so-called pulsed radar level gauge system, the transmit signal generating circuitry may comprise a transmit pulse generator configured to generate the transmit signal in the form of a transmit pulse train having a transmit pulse repetition frequency; and the reference signal providing circuitry may comprise a reference pulse generator configured to generate the reference signal in the form of a reference pulse train having a reference pulse repetition frequency that differs from the transmit pulse repetition frequency.

According to embodiments of an FMCW-type radar level gauge system, the transmit signal generating circuitry may comprise a microwave signal source controllable to generate the transmit signal having a time-varying microwave frequency; and the reference signal providing circuitry may comprises the microwave signal source. In these embodiments, the combining circuitry may advantageously be provided in the form of a mixer for forming a so-called intermediate frequency signal.

The mixer may be provided in the form of any circuitry capable of combining the transmit signal and the reflection signal in such a way that an intermediate frequency signal is formed that is indicative of the phase difference between the transmit signal and the reflection signal One example of a simple and compact mixer is the so-called single diode leaky mixer.

The radar level gauge system may further comprise an energy store configured to store energy when the radar level gauge system is in the idle state and provide energy to the microwave signal source when the radar level gauge system is in the active state.

The local energy store may, for example, comprise a battery, a capacitor, and/or a super capacitor.

Moreover, the radar level gauge system may further comprise wireless communication circuitry, such as a radio transceiver, for wireless communication with a remote system.

It should be noted that the signal propagation device may be any suitable radiating antenna or transmission line probe. Examples of antennas include a horn antenna, a rod antenna, an array antenna and a parabolic antenna, etc. Examples of transmission line probes include a single line probe (Goubau probe), a twin line probe and a coaxial probe etc.

It should also be noted that the processing circuitry may be provided as one device or several devices working together.

According to a second aspect of the present invention, it is provided a method of determining a filling level of a product in a tank using a radar level gauge system, the method comprising the steps of: propagating an electromagnetic transmit signal towards a surface of the product in the tank; receiving an electromagnetic reflection signal resulting from reflection of the electromagnetic transmit signal at impedance discontinuities encountered thereby; forming a digital first measurement signal indicative of a phase relation between the transmit signal and the reflection signal, the first measurement signal being amplitude modulated according to a first gain function in relation to the reflection signal; forming a digital second measurement signal indicative of a phase relation between the transmit signal and the reflection signal, the second measurement signal being amplitude modulated according to a second gain function in relation to the reflection signal, different from the first gain function; and determining the filling level based on the first measurement signal and the second measurement signal.

According to various embodiments of the present invention, the step of forming the digital first measurement signal may comprise the steps of: combining the reflection signal with an electromagnetic reference signal having a known phase relation with respect to the transmit signal, to thereby form a combination signal indicative of a phase relation between the reflection signal and the transmit signal; and providing the combination signal to a first receiver branch being configured to amplitude-modulate the combination signal according to the first gain function in relation to the reflection signal, to form a first amplitude-modulated combination signal; and the step of forming the second measurement signal may comprise the steps of: combining the reflection signal with the electromagnetic reference signal having a known phase relation with respect to the transmit signal, to thereby form a combination signal indicative of a phase relation between the reflection signal and the transmit signal; and providing the combination signal to a second receiver branch being configured to amplitude-modulate the combination signal according to the second gain function in relation to the reflection signal, different from the first gain function, to form a second amplitude-modulated combination signal.

According to embodiments, the step of forming the digital first measurement signal may further comprise the step of: converting the first amplitude-modulated combination signal from analog from to digital form; and the step of forming the second measurement signal may further comprise the step of: converting the second amplitude-modulated combination signal from analog from to digital form.

Further embodiments of, and effects obtained through this second aspect of the present invention are largely analogous to those described above for the first aspect of the invention.

In summary, the present invention thus relates to a radar level gauge system comprising a first receiver branch for converting a reflection signal to a first digital measurement signal, and a second receiver branch configured to convert the reflection signal to a second digital measurement signal. The first receiver branch modulates an amplitude of the first measurement signal according to a first gain function, and the second receiver branch modulates an amplitude of the second measurement signal according to a second gain function different from the first gain function. The radar level gauge system further comprises processing circuitry configured to determine the filling level based on the first measurement signal and the second measurement signal.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS OF THE INVENTION

In the present detailed description, various embodiments of the radar level gauge system according to the present invention are mainly discussed with reference to a radar level gauge system comprising receiver circuitry with a first receiver branch configured to provide a first gain function in the form of a first constant gain factor, and a second receiver branch configured to provide a second gain function in the form of a second constant gain factor.

It should be noted that this by no means limits the scope of the present invention, which equally well includes, for example, a radar level gauge system comprising receiver circuitry with a first receiver branch configured to provide a first frequency dependent gain function (for example using a first frequency filter), and a second receiver branch configured to provide a second frequency dependent gain function (for example using a second frequency filter).

Figure 1:
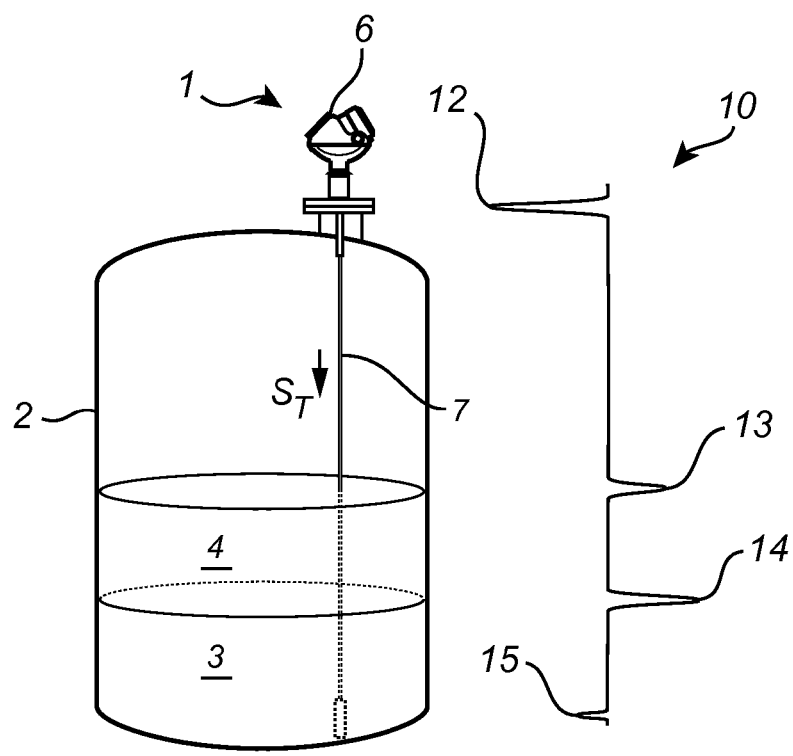
FIG. 1 schematically shows a radar level gauge system according to an example embodiment of the present invention.

FIG. 1 schematically shows a radar level gauge system 1 installed at a tank 2 to measure the filling level of a product in the tank 2. In the present example, the tank 2 actually contains a first product 3 close to the bottom of the tank 2 and a second product 4 higher up in the tank 2. The first product 3 has a higher density than the second product 4.

The radar level gauge system 1 comprises a measurement unit 6, which will be described in further detail below with reference to FIG. 2, and a signal propagation device, here in the form of a transmission line probe 7.

In operation, a transmit signal $S_T$ is propagated by the probe 7 from the measurement unit 6 towards the end of the probe 7. When the transmit signal encounters impedance transitions, portions of the signal will be reflected as a reflection signal. In the schematic and simplified echo curve 10 shown to extend from the measurement unit 6 to the end of the probe 7, an exemplary (time-expanded) reflection signal is indicated. From top to bottom of the tank, the echo curve 10 comprises a so-called fiducial echo 12, a surface reflection echo 13, an interface reflection echo 14, and an end-of-probe reflection echo 15.

Figure 2:
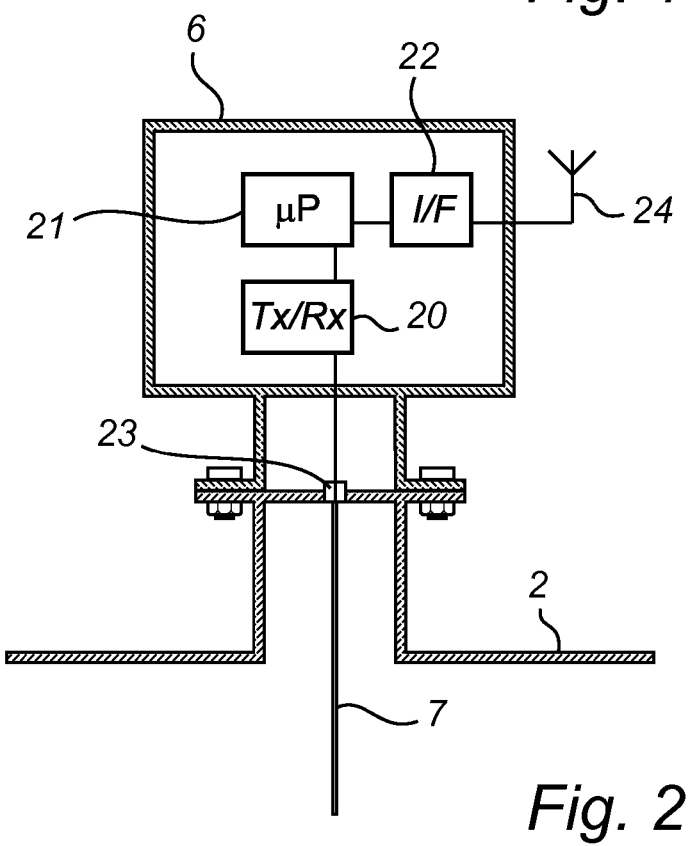
FIG. 2 is a schematic block diagram of the measurement unit comprised in the radar level gauge system in FIG. 1.

FIG. 2 shows a schematic functional block diagram of the radar level gauge system 1 in FIG. 1, where it is in particular indicated that the measurement unit 6 comprises a transceiver 20, processing circuitry 21, and a communication interface 22. The measurement unit 6 (the transceiver 20) is connected to the transmission line probe 7 via a tank feed-through 23 and (the communication interface 22) to a communication channel, in this case indicated as a communication antenna 24.

The transceiver 20 is configured to generate, transmit and receive electromagnetic signals, the processing circuitry 21 is connected to the transceiver 20 and configured to determine the filling level of the first 3 and/or second 4 product in the tank 2 based on a received electromagnetic signal comprising the above-mentioned reflection signals resulting from reflection of the transmit signal at impedance transitions.

The communication interface 22 is connected to the processing circuitry 21 and configured to allow communicating between the radar level gauge system and a remote host. In the example embodiment of FIG. 2, the communication between the radar level gauge system 1 and the remote host is indicated as being wireless communication. Alternatively, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol. Furthermore, pure digital communication protocols such as Modbus or Foundation Fieldbus may be used.

A first embodiment of the radar level gauge system according to the present invention will now be described with reference to the functional block diagram in FIG. 3. As is schematically shown in FIG. 3, the radar level gauge system 1 comprises transmit signal generating circuitry, here in the form of transmit pulse generator 30, signal divider 31, timing controller 32, reference signal providing circuitry, here in the form of reference pulse generator 33, a first receiver branch 34, a second branch 35, and processing circuitry, here provided in the form of microprocessor 36.

The first receiver branch 34 comprises combining circuitry, in the form of signal correlator 37, first amplifier 38, first anti-aliasing filter 39, and first ADC 40.

The second receiver branch 35 comprises combining circuitry, in the form of signal correlator 37, second amplifier 42, second anti-aliasing filter 43, and second ADC 44.

Figure 3:
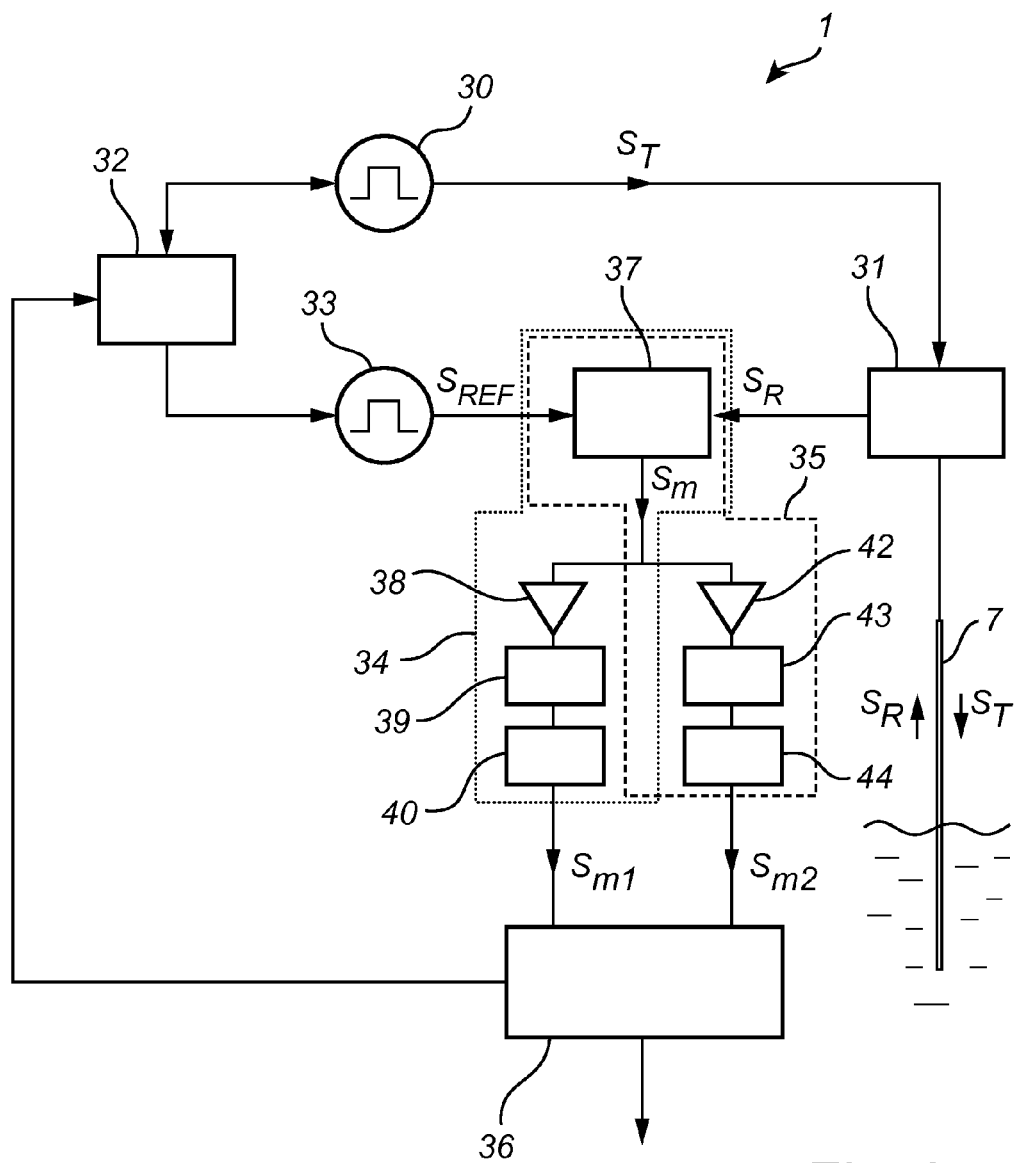
FIG. 3 is a block diagram schematically illustrating a first embodiment of the radar level gauge system in FIG. 1.

As is schematically indicated in FIG. 3, the transmit pulse generator 30 is controlled by the timing controller 32, which is in turn controlled by the microprocessor 36, to generate a transmit signal $S_T$ in the form of a transmit pulse train. The transmit signal $S_T$ is provided to the signal propagation device 7 via the signal divider 31, which may for example be a so-called Wilkinson Power Divider (WPD).

The transmit signal $S_T$ is, as was briefly described above with reference to FIG. 1, is reflected at impedance transitions encountered by the transmit signal, as reflection signal $S_R$. As shown in FIG. 3, the reflection signal $S_R$ is provided to the signal correlator 37 (which is comprised in both the first 34 and the second 35 measurement branches) via the signal divider 31.

In addition to controlling the timing of the transmit pulse generator 30, the timing controller 32 controls the reference pulse generator 33 to generate a reference signal $S_{REF}$ in the form of a reference pulse train.

The reference signal $S_{REF}$ exhibits a pulse repetition frequency that differs slightly from the pulse repetition frequency of the transmit signal $S_T$. At the start of the measurement operation, the reference signal $S_{REF}$ is synchronized with the transmit signal $S_T$, but due to the frequency difference, the phase difference between the transmit signal $S_T$ and the reference signal $S_{REF}$ increases over time.

By correlating the reflection signal $S_R$ and the reference signal $S_{REF}$ in the signal correlator 37, the distance corresponding to an echo signal can be deduced from the phase difference between the reflection signal $S_R$ and the reference signal $S_{REF}$. This technique is generally referred to as time expansion, as is, per se, well-known in the field of radar level gauging.

The signal correlator 37 may, for example, be implemented as a sampler sampling the reflection signal $S_R$ at sampling times controlled by the reference signal $S_{REF}$.

Accordingly, the signal correlator 37 outputs a time-expanded measurement signal $S_m$, based on which the distance from the transceiver to various impedance transitions can be determined.

In the first receiver branch 34, the measurement signal $S_m$ is passed through the first amplifier 38, which amplifies the measurement signal $S_m$ by a first gain factor. Following passage through the first anti-aliasing filter 39 and the first ADC 40, a first digital measurement signal $S_{m1}$ is provided to the microprocessor 36.

Analogously, in the second receiver branch 35, the measurement signal $S_m$ is passed through the second amplifier 42, which amplifies the measurement signal $S_m$ by a second gain factor. Following passage through the second anti-aliasing filter 43 and the second ADC 44, a second digital measurement signal $S_{m2}$ is provided to the microprocessor 36.

Figure 4:
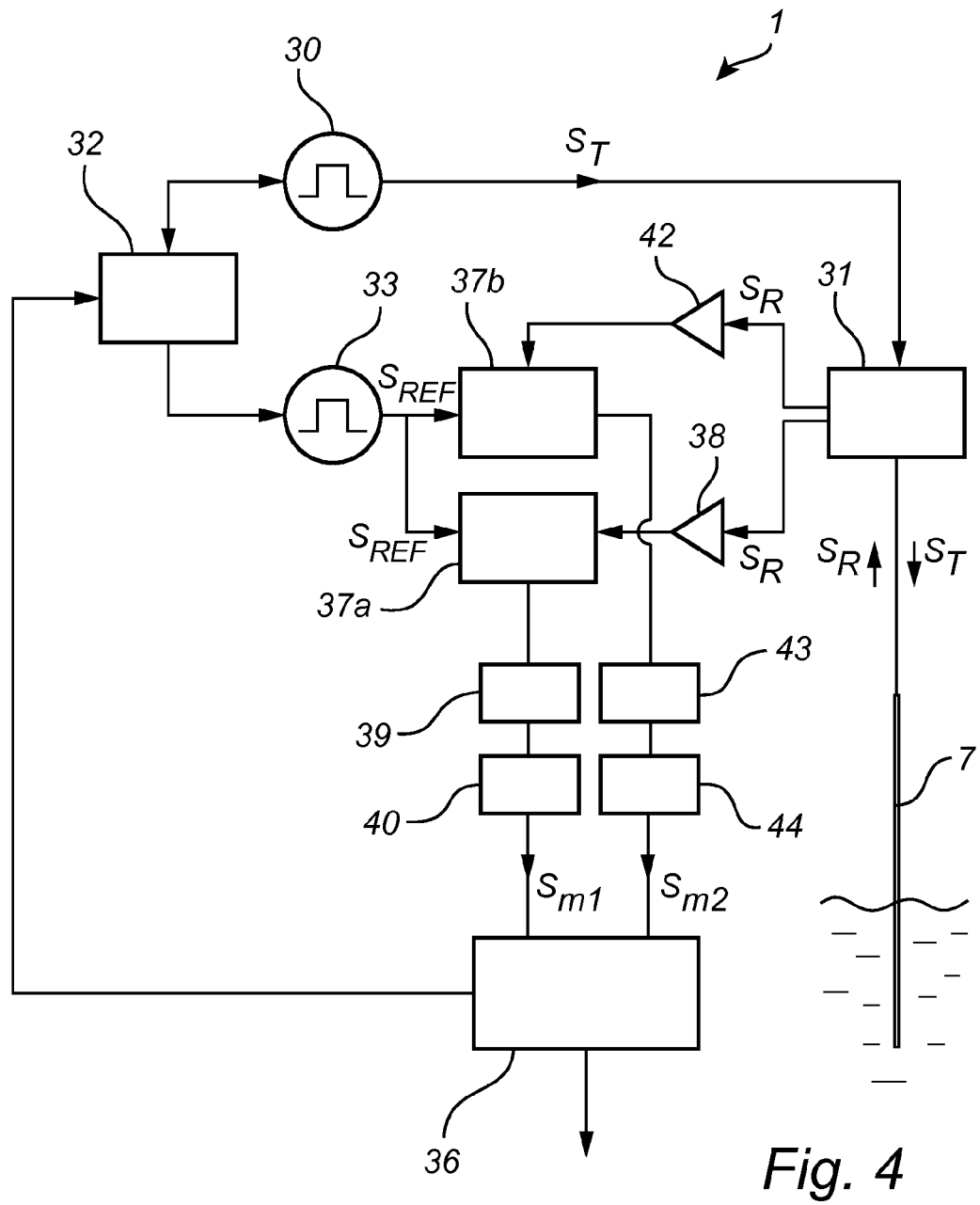
FIG. 4 is a block diagram schematically illustrating a second embodiment of the radar level gauge system in FIG. 1.

A functional block diagram of a second embodiment of the radar level gauge system 1 is schematically shown in FIG. 4. As can be seen in FIG. 4, this second embodiment differs from the first embodiment of FIG. 3 in that the first receiver branch 34 and the second receiver branch 35 do not share the same signal combining circuitry and that the different signal paths are provided starting at the signal dividing circuitry 31.

In the second embodiment of FIG. 4, the first receiver branch 34 thus comprises first amplifier 38, first combining circuitry 37a, first anti-aliasing filter 39, and first ADC 40.

The second receiver branch 35 comprises second amplifier 42, second combining circuitry 37b, second anti-aliasing filter 43, and second ADC 44.

Figure 5:
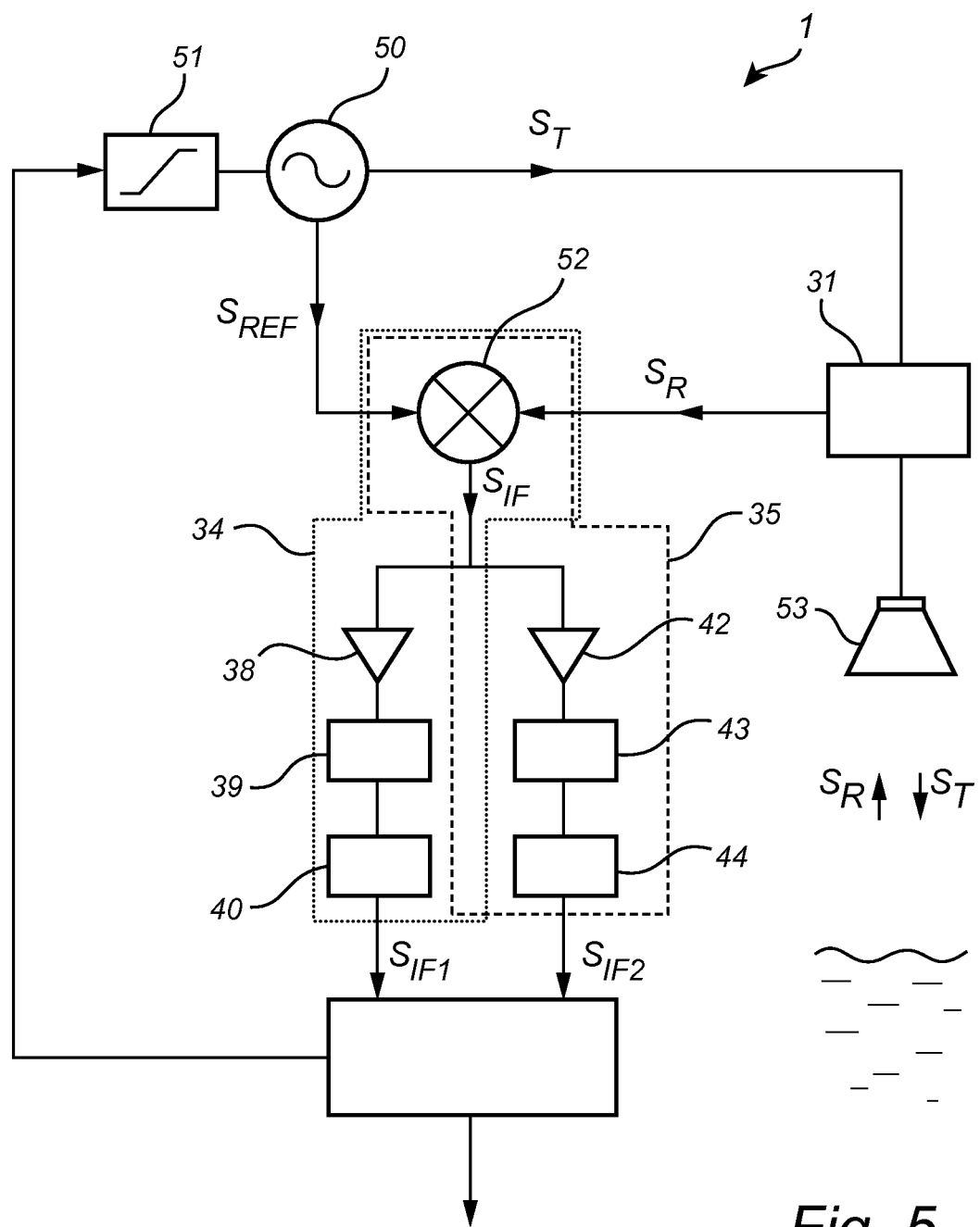
FIG. 5 is a block diagram schematically illustrating a third embodiment of the radar level gauge system in FIG. 1.

So far, embodiments of the present invention have been described with reference to so-called pulsed radar level gauge systems. With reference to FIG. 5, a third embodiment of the radar level gauge system according to the present invention will be described, in the form of a radar level gauge system of the so-called FMCW (Frequency Modulated Continuous Wave) type.

As is schematically indicated in FIG. 5, the radar level gauge system 1 comprises a microwave signal source 50, a microwave signal source controller 51 and a mixer 52.

The microwave signal source controller 51, which is in turn controlled by the microprocessor 36, controls the microwave signal source 50 to output a transmit signal $S_T$ in the form of a frequency sweep that may be continuous or stepped. The transmit signal $S_T$ is propagated towards the surface of the product in the tank by the signal propagation device, here in the form of radiating antenna 53. The transmit signal $S_T$ is also provided as reference signal $S_{REF}$ to one input of the mixer 52. As shown in FIG. 5, the reflection signal $S_R$ resulting in reflection of the transmit signal at encountered impedance transitions is provided to the other input of the mixer 52. In the mixer 52, the reference signal $S_{REF}$ (=$S_T$) and the reflection signal $S_R$ are mixed, resulting in a measurement signal in the form of a so-called intermediate frequency signal (IF-signal). The IF-signal $S_{IF}$ is indicative of the frequency difference (or phase difference) between the transmit signal $S_T$ and the reflection signal $S_R$. From the frequency difference (or phase difference) and knowledge about the configuration of the frequency sweep, the distance to the surface can be determined.

In the same way as was described above with reference to FIG. 3, the IF-signal is split into two signal paths.

In the first receiver branch 34, the IF-signal $S_{IF}$ is passed through the first amplifier 38, which amplifies the IF-signal $S_{IF}$ by a first gain. Following passage through the first anti-aliasing filter 39 and the first ADC 40, a first digital IF-signal $S_{IF1}$ is provided to the microprocessor 36.

Analogously, in the second receiver branch 35, the IF-signal $S_{IF}$ is passed through the second amplifier 42, which amplifies the IF-signal $S_{IF}$ by a second gain. Following passage through the second anti-aliasing filter 43 and the second ADC 44, a second digital IF-signal $S_{IF2}$ is provided to the microprocessor 36.

An example embodiment of the method according to the present invention will now be described with reference to the flow-chart in FIG. 6, as well as the exemplary echo curves in FIGS. 7a-b.

Figure 6:
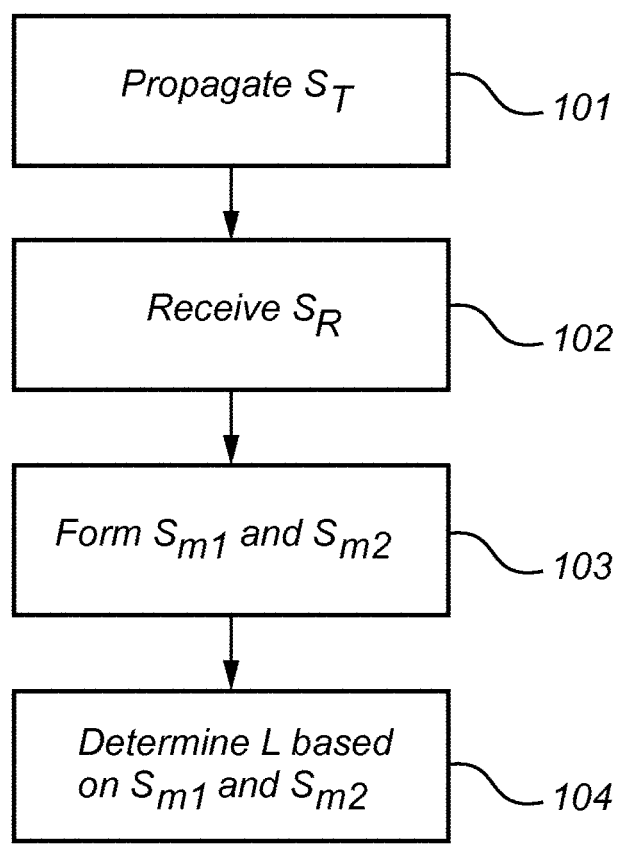
FIG. 6 is a flow-chart schematically illustrating an embodiment of an example embodiment of the method according to the present invention.

Referring first to FIG. 6 and FIG. 1, the transmit signal $S_T$ is propagated towards the first 3 and second 4 products in the tank 2 in a first step 101. In the subsequent step, 102, the reflection signal $S_R$ resulting from reflection of the transmit signal $S_T$ at impedance transitions encountered thereby is received.

As described above with reference to FIG. 3, FIG. 4 and FIG. 5, first $S_{m1}$ and second $S_{m2}$ measurement signals are formed in step 103 based on a timing relation between the transmit signal $S_T$ and the reflection signal $S_R$. The first $S_{m1}$ and second $S_{m2}$ measurement signals have been subjected to different gain functions, where, for example, the first gain function of the first measurement signal $S_{m1}$ may be adapted for a reflection from a reference impedance transition, and the second gain function of the second measurement signal $S_{m2}$ may be adapted for the surface reflection from the surface of the upper (first) product 3 in the tank 2 (or for the interface reflection from the interface between the first product 3 and the second product 4).

Figure 7A:
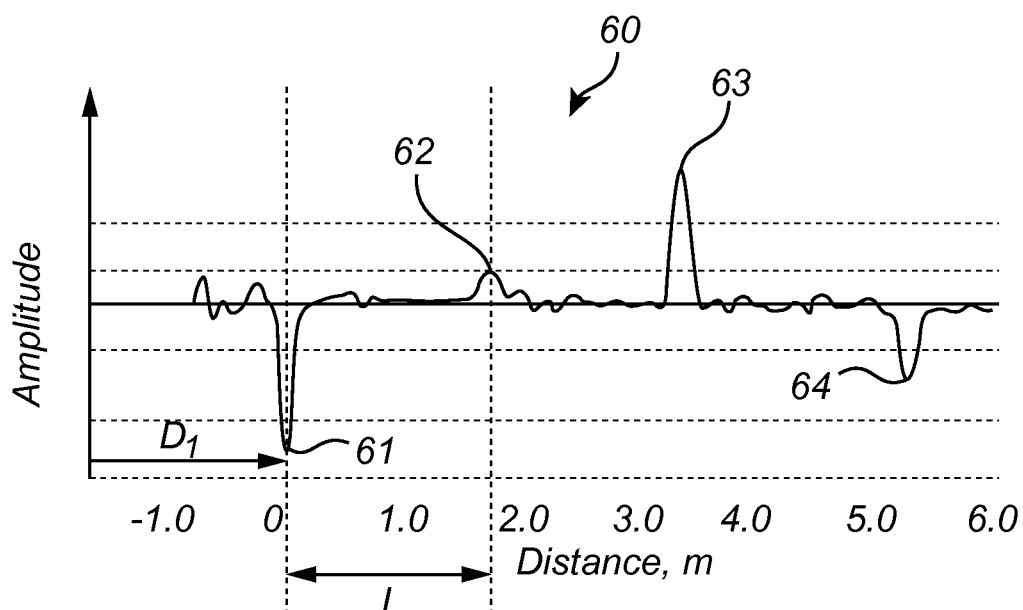
FIGS. 7a-b are diagrams illustrating an exemplary filling level determination using the first and second measurement signals.

An example of the first measurement signal $S_{m1}$ is schematically shown in the form of a first echo curve 60 in FIG. 7a. The first echo curve 60 comprises, from left to right, a so-called fiducial echo 61 resulting from reflection at the impedance discontinuity formed by the connection between the transceiver and the signal propagation device, a surface reflection echo 62 resulting from reflection at the surface of the first product 3, an interface reflection echo 63 resulting from reflection at the interface between the first product 3 and the second product 4, and end-of-probe echo 64 resulting from reflection at the end of the transmission line probe 7.

As can be seen in FIG. 7a, the fiducial echo 61 exhibits a distinct peak that can be precisely correlated to a distance (assigned to 0 m). The surface echo 62 is, however, rather weak, which may make it difficult to correctly determine assign a distance to the surface of the first product 3.

Figure 7B:
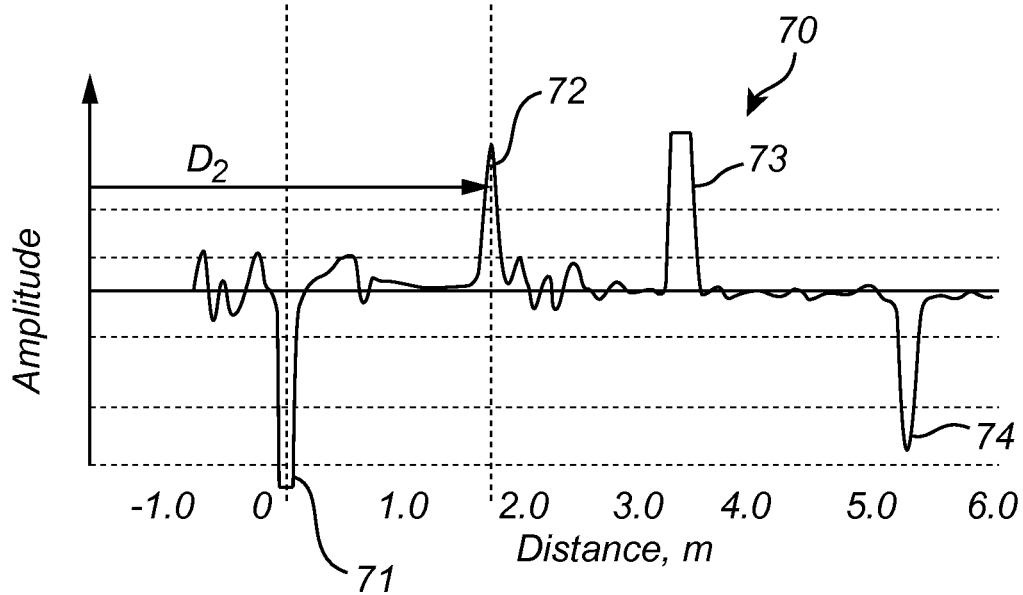

The second measurement signal $S_{m1}$, in the form of a second echo curve 70 is shown in FIG. 7b. This second echo curve 70 includes the same echoes as the first echo curve 60 in FIG. 7a, but with another (higher) gain factor.

Accordingly, the second echo curve 70 comprises, from left to right, a so-called fiducial echo 71 resulting from reflection at the impedance discontinuity formed by the connection between the transceiver and the signal propagation device, a surface reflection echo 72 resulting from reflection at the surface of the first product 3, an interface reflection echo 73 resulting from reflection at the interface between the first product 3 and the second product 4, and end-of-probe echo 74 resulting from reflection at the end of the transmission line probe 7.

As can be seen in FIG. 7b, the fiducial echo 71 and the interface echo 73 are both saturated, making it difficult to accurately determine the distance represented by those echoes.

Returning to the flow-chart in FIG. 6, the distance from the reference impedance transition and the surface of the first product 3 in the tank 2 is determined based on the first measurement signal $S_{m1}$ and the second measurement signal $S_{m2}$ in the final step 104.

As is schematically indicated in FIGS. 7a-b, the distance $D_1$ to the reference impedance transition is determined based on the first echo curve 60 in FIG. 7a, and the distance $D_2$ to the surface of the first product 3 in the tank 2 is determined based on the second echo curve 70 in FIG. 7b.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A radar level gauge system for determining a filling level of a product in a tank, comprising:
   a signal propagation device arranged to propagate an electromagnetic transmit signal towards a surface of the product and to return an electromagnetic reflection signal resulting from reflection of the electromagnetic transmit signal at impedance discontinuities encountered by said transmit signal;
   transmitter circuitry coupled to said signal propagation device and configured to generate and transmit said transmit signal during a measurement cycle;
   receiver circuitry coupled to said signal propagation device and configured to receive said reflection signal during said measurement cycle, said receiver circuitry comprising:
   a first receiver branch configured to transform said reflection signal to a digital first measurement signal being indicative of a phase relation between the transmit signal and the reflection signal received during said measurement cycle, the first measurement signal being amplitude-modulated according to a first gain function in relation to said reflection signal; and
   a second receiver branch configured to transform said reflection signal to a digital second measurement signal being indicative of a phase relation between the transmit signal and the reflection signal received during said measurement cycle, the second measurement signal being amplitude-modulated according to a second gain function, different from said first gain function, in relation to said reflection signal; and
   processing circuitry coupled to said first receiver branch and said second receiver branch, and configured to determine said filling level based on said first measurement signal and said second measurement signal.

2. The radar level gauge system according to claim 1, wherein said second receiver branch is at least partly parallel to said first receiver branch, providing different signal paths between said signal propagation device and said processing circuitry.

3. The radar level gauge system according to claim 1, wherein at least one of said first receiver branch and said second receiver branch comprises amplifier circuitry.

4. The radar level gauge system according to claim 1, wherein at least one of said first receiver branch and said second receiver branch comprises a frequency filter.

5. The radar level gauge system according to claim 1, wherein:
said first receiver branch comprises first analog-to-digital converter circuitry; and
said second receiver branch comprises second analog-to-digital converter circuitry, different from said first analog-to-digital converter circuitry.

6. The radar level gauge system according to claim 1, wherein:
said radar level gauge system further comprises a reference impedance transition; and
said processing circuitry is configured to:
determine a first distance to said reference impedance transition based on said first measurement signal;
determine a second distance to said surface of the product based on said second measurement signal; and
determine said filling level based on said first distance and said second distance.

7. The radar level gauge system according to claim 1, wherein:
said processing circuitry comprises selection circuitry configured to select one of said first measurement signal and said second measurement signal based on a signal criterion; and
said processing circuitry is configured to determine said filling level based on the selected one of said first measurement signal and said second measurement signal.

8. The radar level gauge system according to claim 1 wherein:
said processing circuitry comprises diagnostic circuitry configured to determine a diagnostic value based on a comparison between said first measurement signal and said second measurement signal; and
said processing circuitry is further configured to provide a signal indicative of said diagnostic value.

9. The radar level gauge system according to claim 1, wherein said processing circuitry comprises:
comparison circuitry configured to compare said first measurement signal and said second measurement signal; and
calibration circuitry configured to calibrate at least one of said first measurement branch and said second measurement branch based on said comparison.

10. The radar level gauge system according to claim 1, further comprising:
reference signal providing circuitry coupled to said receiver circuitry,
said reference signal providing circuitry being configured to provide an electromagnetic reference signal indicative of a phase of said transmit signal.

11. A method of determining a filling level of a product in a tank using a radar level gauge system comprising a signal and a second receiver branch, and processing circuitry, said method comprising the steps of:
generating and transmitting, by said transmitter circuitry, and electromagnetic transmit signal;
propagating, by said signal propagation device, said transmit signal towards a surface of said product in the tank;
receiving, by said receiver circuitry, an electromagnetic reflection signal resulting from reflection of said electromagnetic transmit signal at impedance discontinuities encountered thereby;
forming, by said first receiver branch, a digital first measurement signal indicative of a phase relation between said transmit signal and said reflection signal, said first measurement signal being amplitude-modulated according to a first gain function in relation to said reflection signal;
forming, by said second receiver branch, a digital second measurement signal indicative of a phase relation between said transmit signal and said reflection signal, said second measurement signal being amplitude-modulated according to a second gain function in relation to said reflection signal, different from said first gain function; and
determining, by said processing circuitry, said filling level based on said first measurement signal and said second measurement signal.

12. The method according to claim 11, wherein:
said step of forming said digital first measurement signal comprises the steps of:
combining, by said receiver circuitry, said reflection signal with an electromagnetic reference signal having a known phase relation with respect to said transmit signal, to thereby form a combination signal indicative of a phase relation between said reflection signal and said transmit signal; and
providing said combination signal to a first receiver branch being configured to amplitude-modulate said combination signal according to said first gain function in relation to said reflection signal, to form a first amplitude-modulated combination signal; and
said step of forming said second measurement signal comprises the steps of:
combining, by said receiver circuitry, said reflection signal with said electromagnetic reference signal having a known phase relation with respect to said transmit signal, to thereby form a combination signal indicative of a phase relation between said reflection signal and said transmit signal; and
providing said combination signal to a second receiver branch being configured to amplitude-modulate said combination signal according to said second gain function in relation to said reflection signal, different from said first gain function, to form a second amplitude-modulated combination signal.

13. The method according to claim 12, wherein:
said step of forming said digital first measurement signal further comprises the step of:
converting, using first analog-to-digital converter circuitry comprised in said first receiver branch said first amplitude-modulated combination signal from analog from to digital form; and
said step of forming said second measurement signal further comprises the step of:
converting, using second analog-to-digital converter circuitry comprised in said second receiver branch, said second amplitude-modulated combination signal from analog from to digital form.

14. The method according to claim 11, wherein said step of determining comprises the steps of:
determining a first distance to a reference impedance transition based on said first measurement signal;

determining a second distance to said surface of the product based on said second measurement signal; and determining said filling level based on said first distance and said second distance.

\* \* \* \* \*

UNITED STATES PATENT AND TRADEMARK OFFICE
CERTIFICATE OF CORRECTION

| | | |
|---|---|---|
| PATENT NO. | : 9,612,147 B2 | Page 1 of 1 |
| APPLICATION NO. | : 14/176450 | |
| DATED | : April 4, 2017 | |
| INVENTOR(S) | : Christer Frovik | |

It is certified that error appears in the above-identified patent and that said Letters Patent is hereby corrected as shown below:

In the Claims

In Claim 11, Column 13, please amend Lines 63-65 to include the missing words "propagation device, transmitter circuitry, receiver circuitry including a first receiver branch" so that "... a tank using a radar level gauge system comprising a signal and a second receiver branch, and processing circuitry, said method comprising the steps of:" should read --... a tank using a radar level gauge system comprising a signal propagation device, transmitter circuitry, receiver circuitry including a first receiver branch and a second receiver branch, and processing circuitry, said method comprising the steps of:--

Signed and Sealed this
Twentieth Day of November, 2018

Andrei Iancu
*Director of the United States Patent and Trademark Office*